United States Patent
Yamamoto et al.

(10) Patent No.: US 12,405,128 B2
(45) Date of Patent: Sep. 2, 2025

(54) OUTPUT DEVICE

(71) Applicant: TOYOTA JIDOSHA KABUSHIKI KAISHA, Toyota (JP)

(72) Inventors: Shusuke Yamamoto, Tokyo (JP); Chikara Okazaki, Gotemba (JP); Kohta Watatsu, Nagoya (JP); Hideyuki Tanaka, Nisshin (JP); Shinya Murase, Nagoya (JP); Yuki Tatsumoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 18/378,802

(22) Filed: Oct. 11, 2023

(65) Prior Publication Data

US 2024/0151548 A1    May 9, 2024

(30) Foreign Application Priority Data

Nov. 4, 2022   (JP) .................................. 2022-177458

(51) Int. Cl.
   *G01C 21/36*    (2006.01)
   *G06V 20/10*    (2022.01)
   *G06V 20/13*    (2022.01)

(52) U.S. Cl.
   CPC ..... *G01C 21/3685* (2013.01); *G01C 21/3602* (2013.01); *G01C 21/3647* (2013.01); *G06V 20/13* (2022.01); *G06V 20/182* (2022.01)

(58) Field of Classification Search
   None
   See application file for complete search history.

(56) References Cited

U.S. PATENT DOCUMENTS

| | | | |
|---|---|---|---|
| 2009/0177383 A1* | 7/2009 | Tertoolen | G01C 21/3682 |
| | | | 701/532 |
| 2012/0056758 A1* | 3/2012 | Kuhlman | G08G 1/14 |
| | | | 340/932.2 |
| 2014/0350853 A1* | 11/2014 | Proux | G01C 21/34 |
| | | | 701/533 |
| 2017/0191848 A1* | 7/2017 | Jones | G01C 21/3484 |
| 2018/0150773 A1* | 5/2018 | Lee | G08G 1/143 |
| 2018/0301031 A1* | 10/2018 | Naamani | G01C 21/3685 |
| 2020/0400446 A1* | 12/2020 | Beaurepaire | G08G 1/144 |
| 2021/0082284 A1* | 3/2021 | Diehl | G08G 1/0112 |
| 2021/0312808 A1* | 10/2021 | Lee | E04H 6/422 |
| 2022/0150820 A1* | 5/2022 | Newman | H04W 48/20 |
| 2023/0045975 A1* | 2/2023 | Simpson | G08G 1/202 |
| 2023/0400312 A1* | 12/2023 | Beaurepaire | G06Q 50/40 |
| 2024/0151548 A1* | 5/2024 | Yamamoto | G06V 20/182 |

FOREIGN PATENT DOCUMENTS

| | | | |
|---|---|---|---|
| JP | H09-120486 A | | 5/1997 |
| JP | 2001-147133 A | | 5/2001 |
| JP | 3654009 B2 | * | 6/2005 |
| JP | 2022-009869 A | | 1/2022 |

* cited by examiner

*Primary Examiner* — Fekadeselassie Girma
(74) *Attorney, Agent, or Firm* — Oliff PLC (57) ABSTRACT

An output device, including: a memory; and a processor coupled to the memory, the processor configured to: acquire an objective that a user wishes to achieve after boarding a vehicle; and output a candidate site having a shortest total time among candidate sites that would enable the objective to be achieved, the total time including a predicted required time from a current location of the user and a predicted waiting time at a parking lot associated with the candidate site.

4 Claims, 5 Drawing Sheets

OUTPUT DEVICE

CROSS-REFERENCE TO RELATED APPLICATION

This application is based on and claims priority under 35 USC 119 from Japanese Patent Application No. 2022-177458 filed on Nov. 4, 2022, the disclosure of which is incorporated by reference herein.

BACKGROUND

Technical Field

The present disclosure relates to an output device.

Related Art

Japanese Patent Application Laid-open JP-A) No. 2022-009869 discloses an information providing system that predicts the degree of congestion in a parking lot associated with a destination at a predicted time of arrival of the vehicle at the destination, and outputs parking information including the prediction result relating to the degree of congestion and the waiting time at the parking lot.

The information providing system disclosed in JP-A No. 2022-009869 has the problem that it is not possible to identify sites with the shortest total time, including the required time from a current location.

SUMMARY

The present disclosure has been made in consideration of the above facts, and an object thereof is to provide an output device that enables a site to which the total time, including the required time from a current location, is shortest, to be identified.

Means for Solving the Problem

An output device according to a first aspect includes an acquisition unit that acquires an objective that a user wishes to achieve after boarding a vehicle; and an output unit that outputs a candidate site having a shortest total time among candidate sites that would enable the objective to be achieved, the total time including a predicted required time from a current location of the user and a predicted waiting time at a parking lot associated with the candidate site.

In the output device of the first aspect, the acquisition unit acquires the objective that the user wishes to achieve after boarding the vehicle, and the output unit outputs a candidate site having a shortest total time among candidate sites that would enable the objective to be achieved, the total time including a predicted required time from a current location of the user and a predicted waiting time at a parking lot associated with the candidate site. According to the output device of the first aspect, sites to which the total time, including the required time from the current location, is shortest can be identified.

An output device according to a second aspect is the output device of the first aspect, in which the output unit outputs the candidate site having a shortest total time that is a total of the predicted required time, which is predicted from a satellite image capturing a road from the current location to the candidate site, and the predicted waiting time, which is predicted from a satellite image capturing the parking lot.

According to the output device of the second aspect, even if devices such as sensors are not newly installed, sites to which the total time is shortest can be identified.

An output device according to a third aspect is the output device of the second aspect, in which the acquisition unit acquires a target date on which the user wishes to achieve the objective; and the output unit outputs the candidate site having a shortest total time that is a total of the predicted required time, which is predicted from a satellite image capturing the road on a date that is relevant to the target date, and the predicted waiting time, which is predicted from a satellite image capturing the parking lot on a date that is relevant to the target date.

According to the output device of the third aspect, compared to cases in which the predicted required time and predicted waiting time are not predicted based on satellite images recorded on dates associated with the target date, a total time predicted with high accuracy can be identified.

An output device according to a fourth aspect is the output device of any one of the first aspect to the third aspect, in which, in a case in which there is a plurality of candidate sites having the shortest total time, the output unit outputs the candidate site for which the predicted waiting time is shortest among the candidate sites having the shortest total time.

According to the output device of the fourth aspect, compared to a case in which a candidate site with the shortest total time and with the shortest predicted required time is output, congestion of the parking lot can be reduced.

An output device according to a fifth aspect is the output device of any one of the first aspect to the fourth aspect, in which the acquisition unit acquires a destination of the vehicle, and acquires, as the objective, a classification characterizing the destination.

According to the output device of the fifth aspect, the objective that is intended to be achieved at the destination can be achieved at the candidate site with the shortest total time.

According to the present disclosure, it is possible to identify sites to which the total time, including the required time from the current location, is shortest.

BRIEF DESCRIPTION OF THE DRAWINGS

An exemplary embodiment of the present disclosure will be described in detail based on the following figures, wherein.

DETAILED DESCRIPTION

Figure 1:
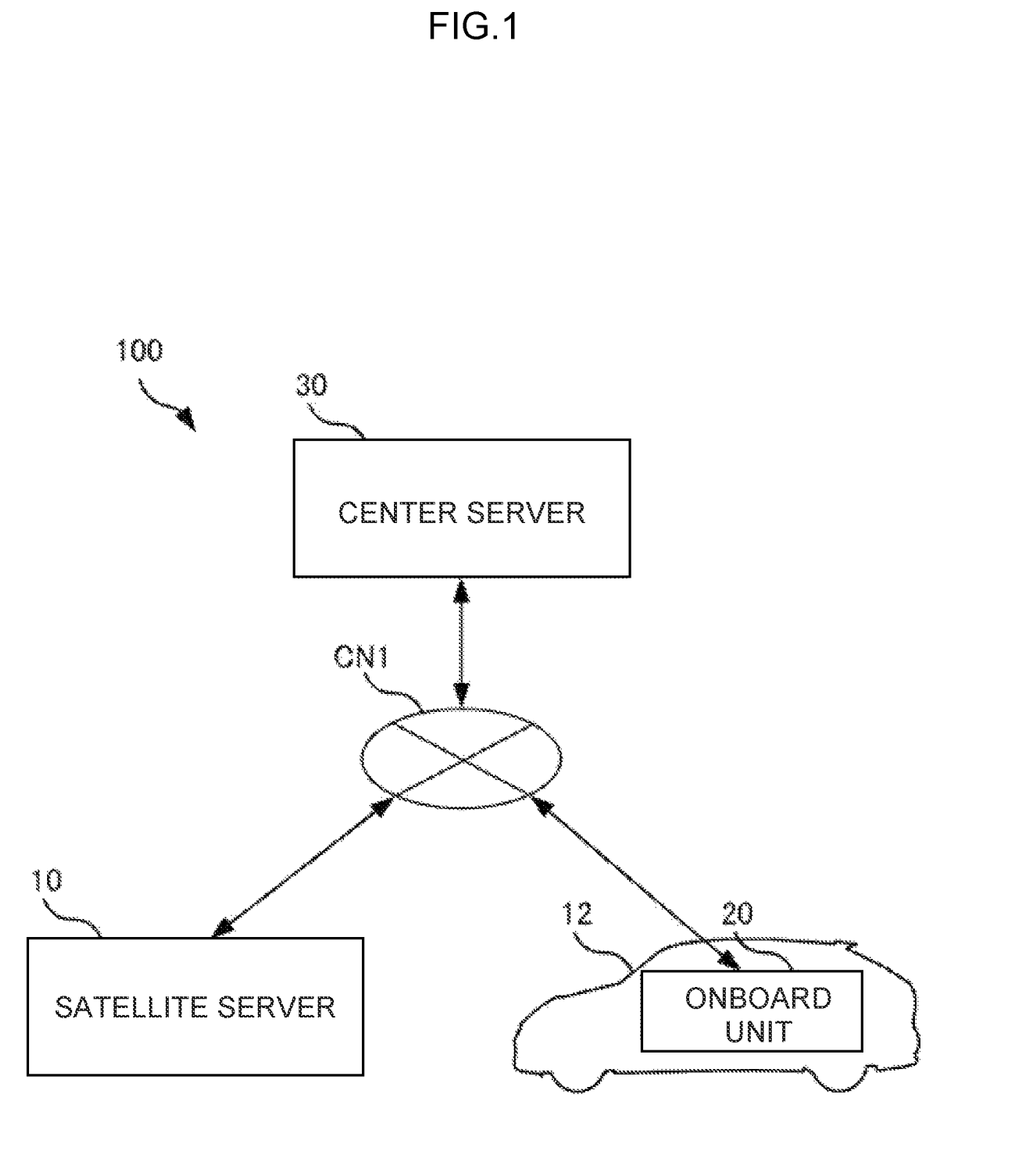
FIG. 1 is a diagram illustrating an exemplary schematic configuration of an output system according to an exemplary embodiment.

As illustrated in FIG. 1, an output system 100 of the present exemplary embodiment is configured including a satellite server 10, a vehicle 12, and a center server 30. The center server 30 is an example of an output device. The vehicle 12 further includes an onboard unit 20. Note that the number of vehicles 12 included in the output system 100 is not limited to the number illustrated in FIG. 1. The satellite server 10, the vehicle 12, and the center server 30 are connected together through a network CN1.

The satellite server 10 accumulates satellite images, these being terrestrial images captured from above by an artificial satellite, an aircraft, or the like. More specifically, the satellite server 10 associates and accumulates the satellite image, the date on which the satellite image was captured, and the location at which the satellite image was captured.

Figure 2:
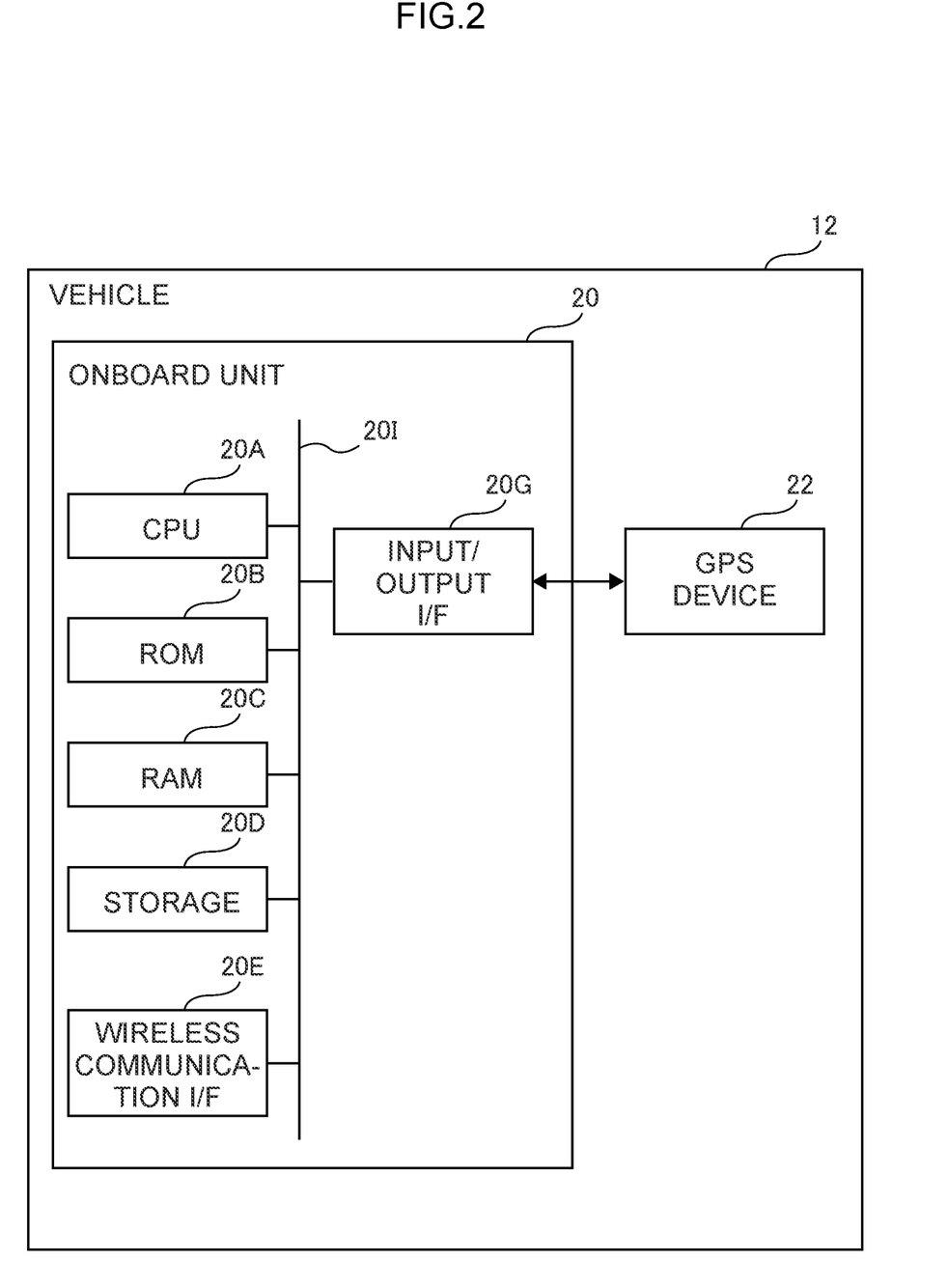
FIG. 2 is a block diagram illustrating an exemplary hardware configuration of a vehicle according to an exemplary embodiment.

FIG. 2 is a block diagram illustrating hardware configuration of devices installed in the vehicle 12 of the present exemplary embodiment. As illustrated in FIG. 2, the vehicle 12 of the present exemplary embodiment includes an onboard unit 20 and a global positioning system (GPS) device 22.

The GPS device 22 is a device that acquires position information that is a current location of the vehicle 12.

The onboard unit 20 is configured including a central processing unit (CPU) 20A, read only memory (ROM) 20B, random access memory (RAM) 20C, storage 20D, a wireless communication interface (I/F) 20E, and an input/output I/F 20G. The CPU 20A, the ROM 20B, the RAM 20C, the storage 20D, the wireless communication I/F 20E, and the input/output I/F 20G are connected so as to be capable of communicating with each other through a bus 201.

The CPU 20A executes various programs and controls various units. Namely, the CPU 20A, which is an example of a hardware processor, loads a program from the ROM 20B or the storage 20D, which correspond to a memory, and executes the program using the RAM 20C as a workspace.

The ROM 20B holds various programs and various data. The RAM 20C serves as a workspace to temporarily store programs and data. The storage 20D serving as a storage unit is configured by a hard disk drive (HDD) or a solid state drive (SSD), and holds various programs including an operating system, as well as various data.

The wireless communication I/F 20E is an interface for connecting to the network CN1.

The input/output I/F 20G is an interface for communicating with various devices installed in the vehicle 12. An onboard unit 20 of the present exemplary embodiment is connected to a GPS device 22 via an input/output I/F 20G. Note that the GPS device 22 may be directly connected to the bus 201.

(Center Server)

Figure 3:
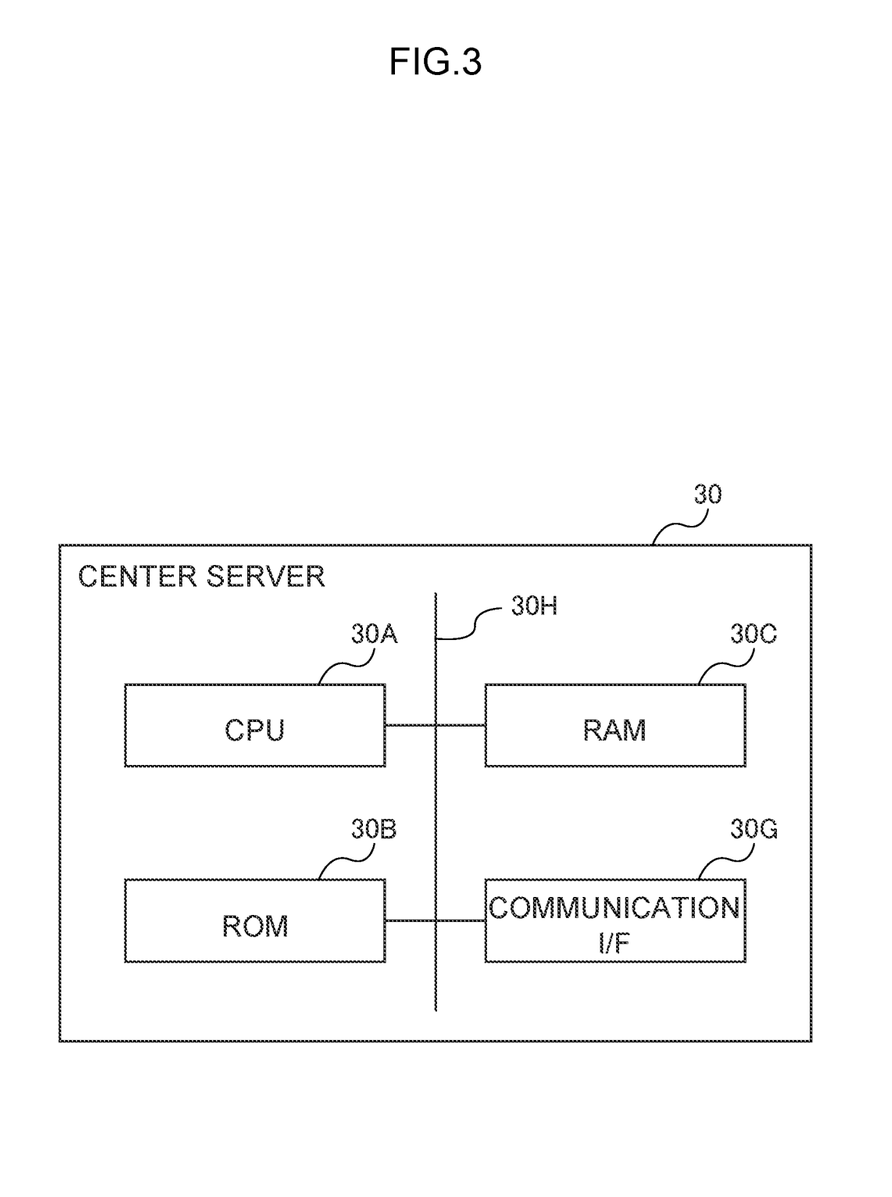
FIG. 3 is a block diagram illustrating an exemplary hardware configuration of a center server according to an exemplary embodiment.

As illustrated in FIG. 3, the center server 30 is configured including a CPU 30A, a ROM 30B, a RAM 30C, and a communication I/F 30G. The CPU 30A, the ROM 30B, the RAM 30C, and the communication I/F 30G are connected so as to be capable of communicating with each other through an internal bus 30H.

The CPU 30A executes various programs and controls various units. Namely, the CPU 30A, which is an example of a hardware processor, loads a program from the ROM 30B, which corresponds to a memory, and executes the program using the RAM 30C as a workspace.

The ROM 30B holds various programs and various data. The RAM 30C serves as a workspace to temporarily store programs and data.

The ROM 30B of the present exemplary embodiment holds an output program and a site database.

The output program is a program for implementing various functionality possessed by the center server 30.

Sites on a map are stored in a site database as a site list, together with the classifications of the sites. The classification is information that outlines the site, such as a supermarket, a park, an amusement park, or a department store. The site database can be updated via the network CN1. Note that the site database may be acquired through the network CN1.

A speed database holds the average speed of a vehicle traveling through a road section for each density (i.e., traffic density) of vehicles in the relevant road section. The speed database according to the present exemplary embodiment holds information such that the average speed decreases as the traffic density increases.

The communication I/F 30G is an interface for connecting to the network CN1.

Figure 4:
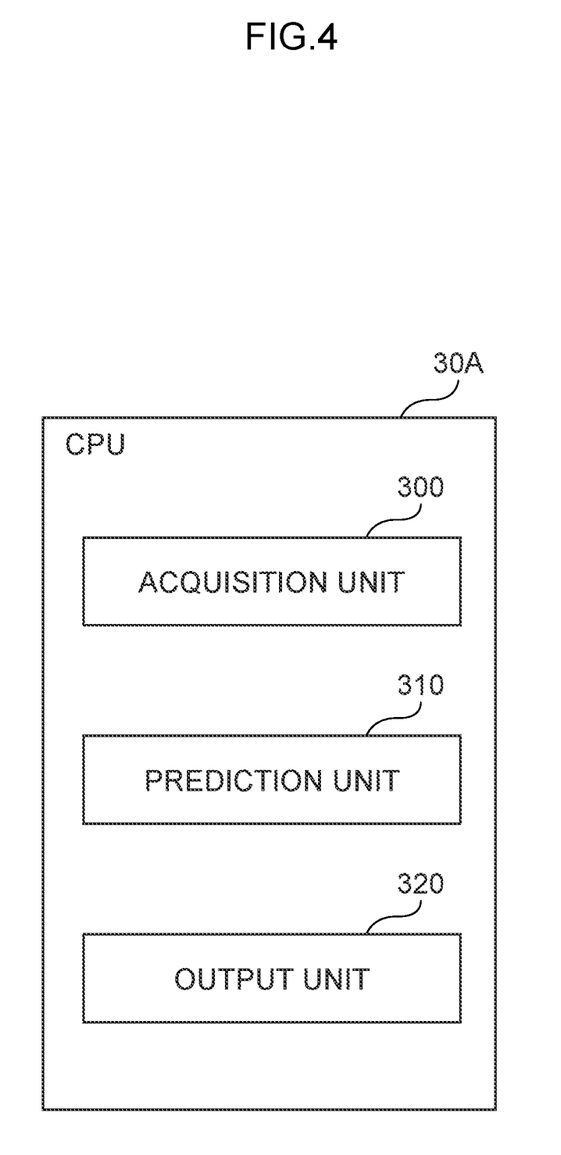
FIG. 4 is a block diagram illustrating an exemplary functional configuration of a CPU in a center server according to an exemplary embodiment.

FIG. 4 is a block diagram illustrating an example of functional configuration of the CPU 30A. As illustrated in FIG. 4, the CPU 30A includes an acquisition unit 300, a prediction unit 310, and an output unit 320. The respective functional configuration is implemented by the CPU 30A reading and executing the output program stored in the ROM 30B.

The acquisition unit 300 has a function of acquiring an objective that a user wishes to achieve by boarding the vehicle 12 (hereafter simply referred to as an "objective"). In the present exemplary embodiment, the acquisition unit 300 acquires a destination of the vehicle 12 (hereafter simply referred to as a "destination") from the onboard unit 20 via the communication I/F 30G. The acquisition unit 300 acquires the classification of the acquired destination as the objective. More specifically, the acquisition unit 300 acquires a classification stored in the site database in association with the acquired destination as the objective. For example, in a case in which the acquisition unit 300 acquires "A Supermarket B Store" as a destination from the onboard unit 20, a classification (such as "Supermarket" or "A Supermarket") stored in association with "A Supermarket B Store" in the site database is acquired as the objective.

Moreover, the acquisition unit 300 acquires candidate sites that are capable of realizing the objective (hereafter, simply referred to as "candidate sites"). More specifically, the acquisition unit 300 acquires all the sites stored in the site database in association with the acquired objective as candidate sites. For example, in a case in which the acquisition unit 300 acquires "Supermarket" as the objective, in the site database, "A Supermarket B Store", "A Supermarket C Store", "A Supermarket D Store", "X Supermarket B Store", and "Y Supermarket C Store" stored in association with "Supermarket" are acquired as candidate sites.

Note that the acquisition unit 300 may acquire the objective directly instead of acquiring the destination. In this case, the acquisition unit 300 acquires an objective (such as a supermarket, a park, an amusement park, or a department store) from the onboard unit 20 via the communication I/F 30G.

Moreover, the acquisition unit 300 acquires the current location of the user (hereafter simply referred to as the "current location") from the onboard unit 20 via the communication I/F 30G. In the present exemplary embodiment, an occupant of the vehicle 12 is applied as a user. Accordingly, in the present exemplary embodiment, the current position acquired by the vehicle 12 via the GPS device 22 is applied as the current location. However, the present invention is not limited to this example. The current location may be position information of a user terminal such as a smartphone owned by the user, or a current location input by the user.

Moreover, the acquisition unit 300 has a function of further acquiring a target date on which the user wishes to achieve the objective. In the present exemplary embodiment, the acquisition unit 300 acquires the target date from the onboard unit 20 via the communication I/F 30G. However, the present invention is not limited to this example. The target date may be acquired from a user terminal such as a smartphone owned by the user.

Then, the acquisition unit 300 acquires a satellite image in which a road from a current location to a candidate site (hereafter simply referred to as a "road") is captured, and a satellite image in which a parking lot associated with a candidate site (hereafter simply referred to as a "parking lot") has been captured, from the satellite server 10 via the communication I/F 30G. Hereinafter, a satellite image capturing a road and a satellite image capturing a parking lot are collectively referred to as a "satellite image".

Note that the acquisition unit 300 acquires two satellite images capturing a parking lot. More specifically, the acquisition unit 300 acquires a satellite image capturing the parking lot, and a satellite image capturing the same parking lot after a predetermined time (such as 10 minutes or 30 minutes) has elapsed since the parking lot was captured.

In the present exemplary embodiment, the acquisition unit 300 acquires from the satellite server 10 a satellite image captured on a date related to the target date. More specifically, the acquisition unit 300 acquires a satellite image captured on a date on which at least one of the day of the week or the time period is the same as the target date. The time period is, for example, one week before and after the same day and month as the target date. For example, in a case in which the target date is Aug. 15, 2023 (Tuesday), the acquisition unit 300 acquires at least one of a satellite image captured on a Tuesday or a satellite image captured from Aug. 8, 2022 to Aug. 22, 2022. Note that the timing may be two weeks before and after the same day as the target date, or one month before and after the same day as the target day. Further, the matter of which of a date on which the target date and the day of the week are the same, a date on which the target date and the time period are the same, or a date on which the target date, the day of the week, and the time period are the same is acquired by the acquisition unit 300 may be predetermined by a user, or may be predetermined by an administrator or the like of the center server 30.

Note that in a case in which the acquisition unit 300 does not acquire the target date, the acquisition unit 300 may acquire the most recent satellite image stored in the satellite server 10.

Moreover, the acquisition unit 300 may acquire a satellite image captured on a date on which at least one of the presence or absence of a holiday or the time period are the same as the target date. The presence or absence of a holiday means whether or not the day is a Saturday, a Sunday, or a national holiday. For example, in a case in which the target date is Aug. 15, 2023 (Tuesday), the target day is not a holiday. The acquisition unit 300 then acquires at least one of satellite images taken on Mondays, Tuesdays, Wednesdays, Thursdays, or Fridays, these being weekdays, or satellite images taken from Aug. 8, 2022, to Aug. 22, 2022.

Moreover, in a case in which the user further acquires a target time at which the user wishes to achieve the objective, the acquisition unit 300 acquires a satellite image captured during the same time of day as the acquired target time. The time of day is, for example, 30 minutes before and after the target time acquired by the acquisition unit 300. For example, in a case in which the target time is 13:00, the acquisition unit 300 acquires satellite images captured from 12:30 to 13:30. Note that the time of day may be one hour before or after the target time acquired by the acquisition unit 300, or three hours before or after the target time, or the like.

In the present exemplary embodiment, the acquisition unit 300 transmits the current location, the candidate site, and the target date to the satellite server 10. The satellite server 10 then transmits to the center server 30 the satellite images for each candidate site captured on a date associated with the target date. As a result, the acquisition unit 300 acquires satellite images for each candidate site captured on a date that is related to the target date. Note that in a case in which a road from a current location to a candidate site is captured across plural satellite images, the acquisition unit 300 acquires the plural satellite images.

The prediction unit 310 predicts a predicted required time from a current location to a candidate site on a target date, and a predicted waiting time for a parking lot, based on the satellite images for each candidate site acquired by the acquisition unit 300. Namely, the prediction unit 310 predicts a total time including the predicted required time and the predicted waiting time on the target date.

More specifically, the prediction unit 310 extracts a region of a road from a current location to a candidate site from a satellite image in which a road has been captured. The prediction unit 310 then extracts the front and rear surfaces of vehicles from the extracted road region, and calculates the number of vehicles traveling on the road. Then, the prediction unit 310 calculates the density of vehicles by dividing the calculated number of vehicles by the area of the relevant road. The prediction unit 310 then reads from the speed database the average vehicle speed stored in association with the calculated vehicle density. The prediction unit 310 then predicts the predicted required time from the current location to the candidate site by dividing the length of the road by the read average speed of the vehicle.

Note that the prediction method of the predicted required time is not limited to the example described above. For example, the prediction unit 310 may predict the predicted required time by inputting a satellite image acquired by the acquisition unit 300 in which the roads are captured into a required time prediction model that has learned the actual required time from one location to another, and a satellite image in which a road from the one location to the other is captured, as a data set.

Alternatively, the prediction unit 310 may predict the predicted required time based on information collected by sensors installed at various points on the road, without using a satellite image in which the road has been captured. Moreover, the prediction unit 310 may predict the predicted required time based on the position information of plural vehicles 12 traveling on the road.

Further, the prediction unit 310 extracts a region of a parking lot from the satellite image in which the parking lot has been captured. In the present exemplary embodiment, a parking lot adjacent to a candidate site is applied as the parking lot. The prediction unit 310 then extracts the front and rear surfaces of vehicles that are stationary in relation to the extracted parking lot region, and calculates the number of vehicles lined up in the parking lot. The prediction unit 310 then identifies the last vehicle of the vehicles lined up in the parking lot. Moreover, the prediction unit 310 calculates the number of vehicles newly lined up behind the last vehicle from a satellite image in which the same parking lot has been captured after a predetermined period of time has elapsed. The prediction unit 310 then divides the number of newly arrayed vehicles by the predetermined time period to calculate the number of vehicles that line up in the parking lot per unit time. Then, the prediction unit 310 predicts the predicted waiting time by dividing the number of vehicles lined up in the parking lot by the number of vehicles that line up in the parking lot per unit time, using Little's law. Note that in a case in which the number of vehicles that line up in the parking lot is zero, the prediction unit 310 predicts the predicted waiting time as zero minutes.

The prediction method of the predicted waiting time is not limited to the example described above. For example, the prediction unit 310 may predict the predicted waiting time by multiplying the average parking time of the parking lot by the number of vehicles lined up in the parking lot. In this case, the average parking time may be stored in advance in the site database, or may be calculated from plural satellite images in which the same parking lot is captured.

Alternatively, the prediction unit 310 may predict the predicted waiting time by inputting a satellite image acquired by the acquisition unit 300 in which the parking lot has been captured into a waiting time prediction model that has learned the actual waiting time of a single parking lot and satellite images in which the single parking lot has been captured as a data set.

Alternatively, the prediction unit 310 may predict the predicted waiting time based on information collected by a sensor installed at the entrance to or from the parking lot, without using a satellite image in which the parking lot has been captured. Moreover, the prediction unit 310 may predict the predicted waiting time based on the position information of vehicles 12 lined up at the parking lot.

The output unit 320 has a function of outputting a candidate site for which the total of the predicted required time from the current location and the predicted waiting time at the parking lot is the shortest among the candidate sites. In the present exemplary embodiment, the output unit 320 outputs the candidate site with the shortest total time that is a total of the predicted required time predicted from the satellite images in which the road has been captured on the date associated with the target date and from the predicted waiting time predicted from the satellite images in which the parking lot has been captured on the date associated with the target date. Namely, the output unit 320 outputs the candidate site with the shortest total time predicted by the prediction unit 310. In the present exemplary embodiment, the output unit 320 outputs the candidate site with the shortest total time to the onboard unit 20 via the communication I/F 30G. However, the present invention is not limited to this example. The output unit 320 may output the candidate site with the shortest total time to a user terminal such as a smartphone owned by the user. In a case in which the center server 30 includes a display device, the output unit 320 may output a candidate spot with the shortest total time to the display device.

Moreover, in the present exemplary embodiment, in a case in which there are plural candidate sites with the shortest total time, the output unit 320 has a function of outputting the candidate site with the shortest predicted waiting time out of the candidate sites with the shortest total time. However, the present invention is not limited to this example. The output unit 320 may output the candidate site with the shortest predicted required time among the candidate sites with the shortest total time, or may output all the candidate sites with the shortest total time. In cases in which there are plural candidate sites with the shortest total time, the matter of which of the candidate site with the shortest predicted waiting time or the candidate site with the shortest predicted required time among the candidate sites with the shortest total time, or all the candidate sites with the shortest total time, is output by the output unit 320 may be predetermined by a user, or may be predetermined by an administrator or the like of the center server 30.

Figure 5:
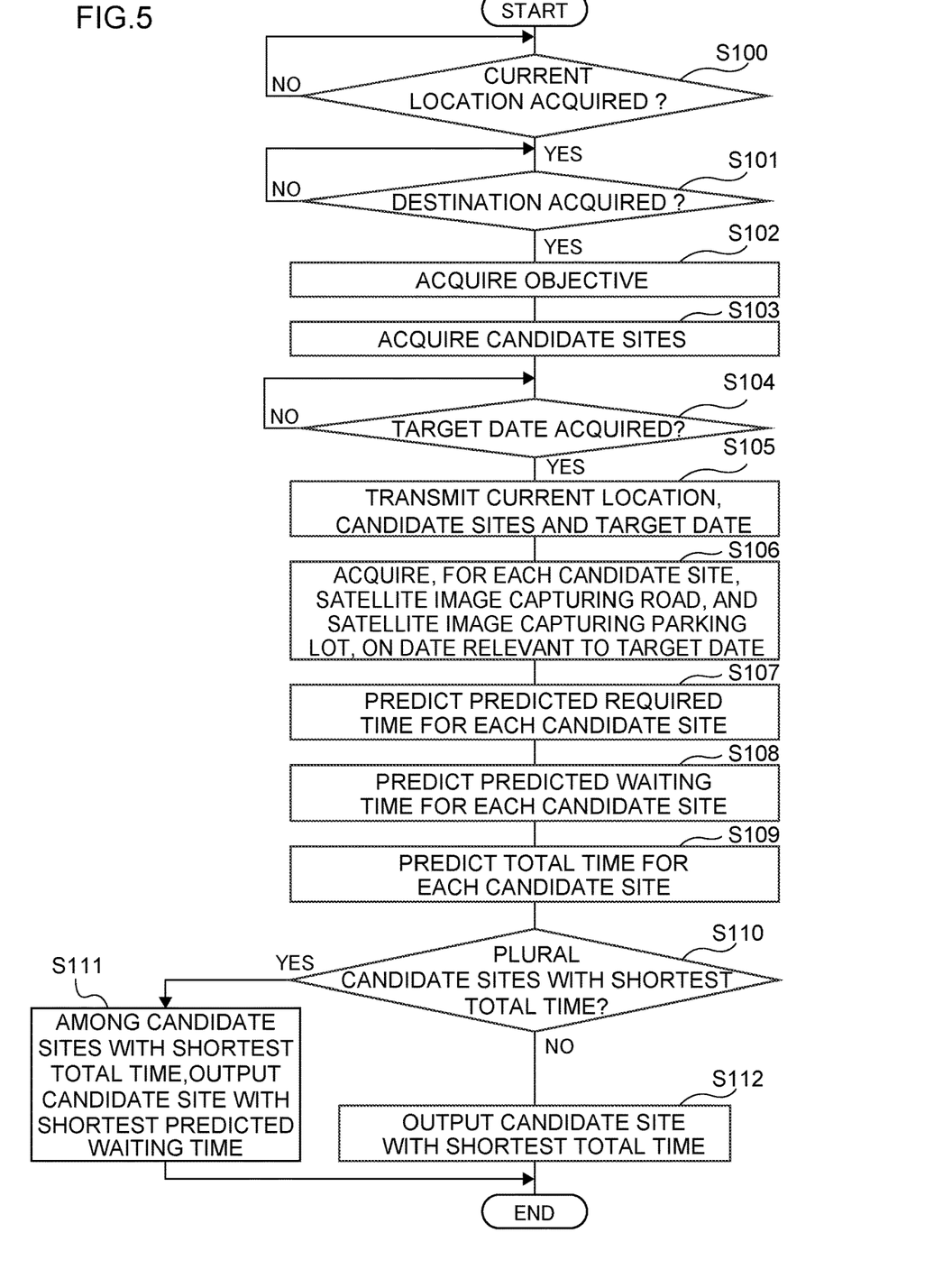
FIG. 5 is a flow chart illustrating an exemplary flow of output processing according to an exemplary embodiment.

Next, explanation follows regarding a flow of output processing for outputting candidate sites with the shortest total time, with reference to FIG. 5. The output processing is performed by the CPU 30A deploying the output program from the ROM 30B to the RAM 30C, and executing the output program in the RAM 30C.

At step S100 in FIG. 5, the CPU 30A waits until the current location is acquired from the onboard unit 20. When the CPU 30A acquires the current location (step S100: YES), the processing transitions to step S101.

At step S101, the CPU 30A waits until it acquires a destination from the onboard unit 20. When the CPU 30A acquires the destination (step S101: YES), the processing transitions to step S102.

At step S102, the CPU 30A acquires the objective. More specifically, the CPU 30A acquires a classification stored in the site database in association with the destination acquired at step S101 as the objective.

At step S103, the CPU 30A acquires candidate sites. More specifically, the CPU 30A acquires all the sites stored in the site database in association with the objective acquired at step S102 as candidate sites.

At step S104, the CPU 30A waits until a target date is acquired from the onboard unit 20. When the target date has been acquired (step S104: YES), the CPU 30A transitions to step S105.

At step S105, the CPU 30A transmits the current location, the candidate site, and the target date to the satellite server 10.

At step S106, the CPU 30A acquires, from the satellite server 10 and for each candidate site, a satellite image in which a road is captured on a date associated with a target date, and a satellite image in which a parking lot is captured. More specifically, the CPU 30A acquires from the satellite server 10 a satellite image of a road and a satellite image of a parking lot captured on a date on which at least one of a day of the week or a time period is the same as the target date for each candidate site.

At step S107, the CPU 30A predicts the predicted required time for each candidate site. More specifically, the CPU 30A predicts the predicted required time for each candidate site by dividing the length of the road by the average speed of vehicles calculated based on the satellite image in which the relevant road is captured.

At step S108, the CPU 30A predicts a predicted waiting time for each candidate site. More specifically, the CPU 30A predicts the predicted waiting time by dividing the number of vehicles that line up in the parking lot calculated from the satellite image in which the parking lot is captured, by the number of vehicles lined up in the parking lot per unit time.

At step S109, the CPU 30A predicts the total time for each candidate site. More specifically, the CPU 30A adds together the predicted required time predicted at step S107 and the predicted waiting time predicted at step S108.

At step S110, the CPU 30A determines whether or not there are plural candidate sites with the shortest total time. In a case in which there are plural candidate sites with the shortest total time (step S110: YES), the CPU 30A transitions to step S111. On the other hand, in a case in which there is one candidate site with the shortest total time (step S110: NO), the CPU 30A transitions to step S112.

At step S111, the CPU 30A outputs to the onboard unit 20 the candidate site with the shortest predicted waiting time among the candidate sites with the shortest total time, and ends the present output processing.

At step S112, the CPU 30A outputs the candidate site with the shortest total time to the onboard unit 20, and ends the present output processing.

[Notes]

Note that in the above exemplary embodiments, a center server 30 configured separately from the vehicle 12 is applied as the output device. However, the present invention is not limited to this example. A device incorporated in the vehicle 12 may be applied as an output device. Alternatively, a user terminal owned by a user may be applied instead of the vehicle 12. In this case, a device built into the user terminal may be applied as the output device.

Moreover, in the above exemplary embodiments, satellite images are accumulated in a satellite server 10 configured separately from the center server 30. However, the present invention is not limited to this example. The satellite images may be stored in a storage device such as the ROM 30B or the storage included in the center server 30.

Moreover, in the above exemplary embodiments, the center server 30 predicts the total time. However, the present invention is not limited to this example. Devices other than the center server 30 may predict the total time. In this case, the center server 30 outputs the candidate site to which the total time predicted by the devices other than the center server 30 is the shortest.

Note that the processing executed by the CPU reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although explanation has been given regarding an aspect in which the respective programs are stored (installed) in advance in the ROM in the above exemplary embodiments, there is no limitation thereto. The program may be provided in a format recorded on a recording medium such as compact disc read only memory (CD-ROM), digital versatile disc read only memory (DVD-ROM), or universal serial bus (USB) memory. Alternatively, the programs may be provided in a format downloadable from an external device over a network.

The flow of processing described in the above exemplary embodiments is also an example, and unnecessary steps may be deleted, new steps may be added, or the processing order may be rearranged within a range not departing from the spirit of the present invention.

The configurations of the satellite server 10, the vehicle 12, and the center server 30 described in the above exemplary embodiments are examples, and may be modified according to circumstances within a range not departing from the spirit of the present invention.

What is claimed is:

1. An output device, comprising:
a memory; and
a processor coupled to the memory,
the processor configured to:
acquire an objective that a user wishes to achieve after boarding a vehicle;
output a candidate site having a shortest total time among candidate sites that would enable the objective to be achieved, the total time including a predicted required time from a current location of the user and a predicted waiting time at a parking lot associated with the candidate site; and
output the candidate site having a shortest total time that is a total of the predicted required time, which is predicted from a satellite image capturing a road from the current location to the candidate site, and the predicted waiting time, which is predicted from a satellite image capturing the parking lot.

2. An output device, comprising:
a memory; and
a processor coupled to the memory,
the processor configured to:
acquire an objective that a user wishes to achieve after boarding a vehicle;
output a candidate site having a shortest total time among candidate sites that would enable the objective to be achieved, the total time including a predicted required time from a current location of the user and a predicted waiting time at a parking lot associated with the candidate site;
output the candidate site having a shortest total time that is a total of the predicted required time, which is predicted from a satellite image capturing a road from the current location to the candidate site, and the predicted waiting time, which is predicted from a satellite image capturing the parking lot;
acquire a target date on which the user wishes to achieve the objective; and
output the candidate site having a shortest total time that is a total of the predicted required time, which is predicted from a satellite image capturing the road on a date that is relevant to the target date, and the predicted waiting time, which is predicted from a satellite image capturing the parking lot on a date that is relevant to the target date.

3. An output device, comprising:
a memory; and
a processor coupled to the memory,
the processor configured to:
acquire an objective that a user wishes to achieve after boarding a vehicle; and
output a candidate site having a shortest total time among candidate sites that would enable the objective to be achieved, the total time including a predicted required time from a current location of the user and a predicted waiting time at a parking lot associated with the candidate site, wherein, in a case in which there is a plurality of candidate sites having the shortest total time, the processor outputs the candidate site for which the predicted waiting time is shortest among the candidate sites having the shortest total time.

4. The output device of claim 1, wherein the processor acquires a destination of the vehicle, and acquires, as the objective, a classification characterizing the destination.

* * * * *